United States Patent [19]

Makita et al.

[11] 3,991,169

[45] Nov. 9, 1976

[54] METHOD FOR THE PRODUCTION OF POROUS CARBON SHEET

[75] Inventors: Hiromitsu Makita; Jun Yamada; Yoshio Kawai, all of Tokyo, Japan

[73] Assignee: Kureha Kagaku Kogyo Kabushiki Kaisha, Nihonbashi, Japan

[22] Filed: Mar. 13, 1975

[21] Appl. No.: 557,996

[30] Foreign Application Priority Data

Mar. 13, 1974 Japan.................................. 49-28861

[52] U.S. Cl.............................. 423/445; 264/29.3; 423/447.4; 423/448; 423/449; 429/44
[51] Int. Cl.². .......................................... C01B 31/02
[58] Field of Search ........... 423/445, 449, 448, 447; 264/29; 136/120 FC, 121, 122; 428/367, 408; 427/115, 227

[56] References Cited
UNITED STATES PATENTS

| | | | |
|---|---|---|---|
| 3,407,038 | 10/1968 | Beasley................................. | 423/447 |
| 3,629,379 | 12/1971 | Otani............................... | 423/447 X |
| 3,649,196 | 3/1972 | Degginger........................... | 423/449 |
| 3,671,385 | 6/1972 | Trent................................ | 423/447 X |
| 3,736,159 | 5/1973 | Gibson et al...................... | 264/29 X |
| 3,829,327 | 8/1974 | Omori et al....................... | 423/447 X |

*Primary Examiner*—Edward J. Meros
*Attorney, Agent, or Firm*—Lane, Aitken, Dunner & Ziems

[57] ABSTRACT

A porous carbon sheet having excellent physical properties is obtained by dispersing oxidized pitch fibers in a liquid containing at least one wetting agent having at least one hydroxyl group and a boiling point of not less than 150° C, subsequently shaping the resultant dispersion in the form of a sheet, heating the sheet thus obtained at temperatures in the range of from 50 to 300° C and thereafter, carbonizing the sheet in a nonoxidizing atmosphere. The oxidized pitch fibers contain 45 – 90% by weight of nitrobenzene insolubles and 55 – 90% by weight of fixed carbon and will not flow through a nozzle of 1 mm in diameter under a load of 10 Kg/cm² at temperatures of not more than 300° C. The pitch fiber has a diameter in the range of 5 to 100 $\mu$ and a fiber length/fiber diameter ratio of not less than 2.

9 Claims, 2 Drawing Figures

METHOD FOR THE PRODUCTION OF POROUS CARBON SHEET

FIELD OF THE INVENTION

This invention relates to a method for the production of porous carbon sheets using oxidized pitch fibers as the raw material, and more particularly to a method for the production of porous carbon sheets especially useful as the base material for electrodes in fuel cells.

BACKGROUND OF THE INVENTION

It has been well-known to those skilled in the art to produce carbon paper or carbon sheet by molding carbonaceous fibers in the form of sheets. The carbon paper or carbon sheet obtained by this method, however, suffer from the disadvantage that the individual fibers are bonded to one another with insufficient strength and therefore, the carbon paper or carbon sheet possess unsatisfactory mechanical strength and electrical and other physical properties. To overcome these defects several methods have been developed including, for example, the gaseous-phase thermal-decomposition carbon deposition method and the polymer coating method. The former method involves complicated steps and therefore, the products are inevitably costly. In the products of the latter method, the individual carbon fibers and the polymer are not bonded to each other with satisfactory high strength. In addition, the products of both methods are not completely satisfactory because the voids formed therein are dimensionally nonuniform.

Under the above circumstances, there exists a need for carbon paper or carbon sheet having dimensionally uniform voids and excellent mechanical strength and electrical properties.

SUMMARY OF THE INVENTION

It is, therefore, an object of the present invention to provide a method for the production of porous carbon sheet which is free from the above-mentioned defects of the prior art products.

It has now been discovered that a superior carbon sheet can be obtained by using, as the raw material, oxidized pitch fibers (which may be described as a precursor of pitch-type carbon fibers), dispersing the fibers in a specific liquid, molding the resultant dispersion in the form of sheet, subjecting the sheet to heat treatment and thereafter, carbonizing the heated sheet.

Accordingly, the present invention involves the steps of dispersing, in a liquid comprising at least one organic compound having at least one hydroxyl group and a boiling point of not less than 150° C, oxidized pitch fibers which contain 45 – 90% by weight of nitrobenzene insolubles and 55 – 96% by weight of fixed carbon. The nature of the fibers is such that, when tested in a flow tester having a nozzle of 1 mm in diameter under a load of 10 kg/cm² at temperatures of not more than 300° C, they will not melt so as to discharge through the nozzle. The fibers have diameters in the range of 5 to 100 $\mu$ and fiber length/fiber diameter ratios of not less than 2. The slurry is subsequently formed into a sheet and the sheet thus obtained is heated at temperatures in the range of from 50 to 300° C. Thereafter, the sheet is carbonized in a nonoxidizing atmosphere.

In the flow test method, 1 g of a test sample is stuffed into a cylinder having a cross-sectional area of 1 cm² and a nozzle of 1 mm in diameter near the center of the bottom. The test sample within the cylinder is heated to 300° C at a heating rate of 6° C/minute while pressed with a piston under a load of 10 kg/cm². In the heating treatment thus conducted, visual observation is used to determine whether or not the test sample is melted and discharged through the nozzle located at the bottom of the cylinder.

BRIEF DESCRIPTION OF THE DRAWINGS

In the accompanying drawings.

Figure 1:
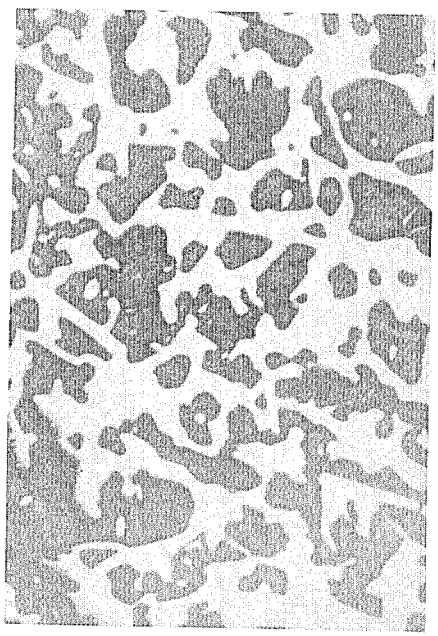
FIG. 1 is a photomicrograph of the cross section of a porous carbon sheet of the present invention.

DETAILED DESCRIPTION OF THE INVENTION:

Oxidized pitch fibers are generally obtained by melt-spinning, for example, thermally cracked petroleum pitch, coal pitch, asphalt, etc., and subjecting the resultant fibers to a heat treatment in an atmosphere of air, oxygen, nitrogen oxides or some other oxidizing gas or in a liquid oxidizing agent such as permanganic acid solution at temperatures in the range of from room temperature to 350° C. It should be understood that, of these oxidized pitch fibers those suitable for use as the raw material for the present invention are limited to those meeting the requirement that they contain 45 - 90% by weight of nitrobenzene insolubles and 55 – 96% by weight of fixed carbon and which give a negative result (no flow) when tested using a flow tester in the manner previously described. The oxidized pitch fibers not meeting the above criteria, when used as the raw material, fail to fulfil satisfactorily the objects of the present invention even if they are treated in accordance with the operative steps of the present invention.

The liquid to be used for the purpose of dispersing the oxidized pitch fibers in the present invention, contains one or more organic compounds which have at least one hydroxyl group and a boiling point of not less than 150° C. The organic compounds of this description provide for good wetting of the oxidized pitch fibers. Examples of the organic compounds satisfying this requirement include alkylene glycols such as ethylene glycol and propylene glycol; polyalkylene glycols such a polyethylene glycol and polypropylene glycol; glycerine; and cyclohexanol. As the liquid described above, one member or a mixture of two or more members selected from the aforementioned organic compounds may be used. Solutions containing one member or a mixture of two or more members dissolved in a solvent such as water or a lower alcohol may also be used. The concentration of the wetting agent or mixture of wetting agent in solution should not be less than 5%, preferably more than 20%.

As the first step in the present invention, the oxidized pitch fibers are dispersed in the aforementioned liquid. By this dispersion, the oxidized pitch fibers are uniformly coated by the wetting agent or agents. The dispersion is preferably homogenized as by mechanical agitation, for example, because the homogenization further improves the dimensional uniformity of voids formed in the porous carbon sheet obtained as a final product. The void ratio and the dimensions of voids formed in the porous carbon sheet product can be controlled by suitably selecting the length of the oxidized carbon fibers to be used in the dispersion. Where the wetting agent is used in the form of a solution as described above, the degree with which the individual fibers are fused to one another (cohering property) during carbonization (latter described) can be varied with the concentration of wetting agent or agents in the solution. The mechanical strength, electric conductivity and void ratio of the porous carbon sheet product can, therefore, be controlled by suitably varying the concentration of wetting agent.

The fiber dispersion is next formed into a sheet by an ordinary method, for example, with the aid of a filter, except that no binder is employed. As a result, there can be formed on the filter a sheet in which the oxidized pitch fibers coated, as described above by a wetting agent or agents are piled up in a pattern of point-to-point contact to a uniform thickness throughout the entire area. Subsequently, the sheet thus obtained is heated at temperatures in the range of from 50° to 300° C, with the result that some interaction occurs between the oxidized pitch fibers and the wetting agent. This interaction enables the individual oxidized pitch fibers to cohere with each other and consequently imparts strength to the sheet. At temperatures not exceeding 50° C, this interaction does not occur. At temperatures exceeding 350° C, however, there is a possibility that the coat formed on the oxidized pitch fibers by the wetting agent or agents will undergo decomposition. For the purpose of the present invention, therefore, the heat treatment is required to be carried out at temperatures in the range of from 50° to 300° C. A sufficient duration for this heat treatment is in the approximate range of from 5 minutes to 4 hours. The sheet has substantially no strength prior to the heat treatment described above. It is, therefore, more desirable to subject the sheet to this heat treatment while still supported by the filter. When the sheet is heated in conjunction with the filter, the sheet has only to be separated from the filter at the end of the heat treatment. The sheet which has undergone the heat treatment is subsequently carbonized by an ordinary method in a nonoxidizing atmosphere. In the carbonization, the individual fibers in the sheet are fused and bonded to one another at their points of contact to afford a porous carbon sheet with excellent fiber to fiber bond strength.

As described above, the present invention enables production of porous carbon sheet having dimensionally uniform voids and excellent mechanical strength, electrical properties and other physical properties. The porous carbon sheet obtained by the present invention, therefore, can be utilized in various applications and it is especially useful as the base material for electrodes in fuel cells and as filter elements.

The present invention will be described more specifically below by examples with reference to preferred embodiments. It should be noted, however, that the present invention is not limited in any way to these examples.

EXAMPLE 1

Three types (A, B and C) of oxidized pitch fibers (measuring 10 $\mu$ in fiber diameter and 100 $\mu$ in fiber length) shown in Table 1 were each added to a diluting solution consisting of 35% by weight of water, 35% by weight of ethanol and 30% by weight of polyethylene glycol (molecular weight 400) in the proportion of 5 parts by weight of fibers to 100 parts by weight of solution and then agitated thoroughly to ensure uniform dispersion. The dispersion thus obtained was filtered (to the shape of sheet) by use of a filter made of cotton fabric, with the excess solution being removed by means of a suction pump.

The deposit formed in the shape of sheet on the filter, intact thereon, was placed under a load of 1 g/cm² and dried in a constant temperature bath at 90° C for about 30 minutes. The sheet was subsequently placed in another constant temperature bath at 160° C, heated to 200° C for a period of about 30 minutes, held at the elevated temperature for about 10 minutes, removed from the bath and allowed to cool.

At the end of cooling, the sheet was peeled away from the filter and carbonized by burning at temperatures up to 1,000° C for 6 hours under a load of 4 g/cm² in a nonoxidizing atmosphere, with the flatness of surfaces maintained intact. It was further subjected to a heat treatment at 2,000° C for 3 minutes.

The results of carbonization of the three sheets are summarized in Table 2. The general properties exhibited by each porous carbon sheet obtained by carbonization are shown in Table 3. The mechanical and electrical properties are shown in Table 4.

FIG. 1 is a microphotograph of a cross section of the porous carbon sheet produced from carbon fibers A. In the photograph, the white portions are carbon and the black to gray portions are voids.

Figure 2:
FIG. 2 is a photomicrograph of the cross section of a prior art carbon sheet having carbon thermally decomposed in the gaseous phase deposited on the surface.

For the purpose of comparison, Tables 3 and 4 show the properties of the carbon sheet formed by the deposition of gaseous-phase thermally decomposed carbon according to the conventional technique. FIG. 2 is a microphotograph of a cross section of this carbon sheet.

As the results clearly indicate, the sheet obtained had a porous texture, showed high bending strength, possessed flexibility and enjoyed satisfactory electric conductivity.

From the photomicrographs, it is clear that the porous carbon sheet according to the present invention enjoyed uniformity of both void distribution and void dimensions as compared with the carbon sheet formed by deposition of gaseous-phase thermally decomposed carbon according to the conventional technique.

Table 1

| Type of fibers used as raw material | A | B | C |
|---|---|---|---|
| Fixed carbon content (%) | 78.3 | 70.2 | 71.3 |
| Nitrobenzene insolubles content (%) | 55 | 61 | 70 |

Table 2

| Type of fibers used as raw material | A | B | C |
|---|---|---|---|
| Yield of carbonization (%) | 64.8 | 57.7 | 59.9 |
| Coefficient of linear contraction (%) | 17.5 | 22.4 | 20.2 |

Table 3

| Type of fibers used as raw material | A | B | C | Carbon sheet by gaseous-phase thermal-decomposition carbon deposition method |
|---|---|---|---|---|
| Thickness (mm) | 0.40 | 0.44 | 0.42 | 0.48 |
| Sheet weight (g/m²) | 235 | 235 | 226 | 167 |
| Bulk density (g/cm³) | 0.57 | 0.53 | 0.55 | 0.35 |
| Void ratio (%) | 64.2 | 66.7 | 65.5 | 81.9 |

$$\text{Void ratio} = \frac{\text{True specific gravity} - \text{bulk density}}{\text{True specific gravity}} \times 100$$

True specific gravity: This was determined, in accordance with ASTM D 792-64T, by weighing a sample carbon sheet in air and in a methanol solution at 20° C and applying the results to the following formula.

$$\rho_c = W_1 \rho_M / (W_1 - W_2)$$

$\rho_c$ = True specific gravity of the carbon portion of sheet
$W_1$ = Weight of sample carbon sheet in air
$W_2$ = Weight of sample carbon sheet in methanol solution at 20° C
$\rho_M$ = Specific gravity of methanol at 20° C Table 4

| Type of fibers used | Carbon sheet by gaseous-phase thermal-decomposition carbon deposition method | | | |
|---|---|---|---|---|
| as raw material | A | B | C | |
| Bending strength, kg/mm² | 2.00 | 1.95 | 1.44 | 0.56 |
| Young's modulus, kg/mm² | 274 | 258 | 220 | 72 |
| Flexure at break, mm/10 cm | 6.1 | 5.5 | 5.2 | 7.0 |
| Specific resistance × 10⁻²Ωcm | 1.90 | 1.95 | 1.98 | 1.98 |

Method for bending test:

A three-point bending test was carried out by use of an autograph made by Shimazu Seisakusho under the following conditions.
Testing temperature — 20° C
Width of test specimen — 15 mm
Dimension of spin — 100 mm
Rate of load application — 5 mm/min.

The term "flexure at break" refers to the maximum flexure that occurred when the test specimen was broken in the course of testing by the aforementioned method.

EXAMPLE 2

By following the procedure of Example 1, sheets were molded by dispersing, in diluting solutions of the varying compositions indicated in Table 6, oxidized pitch fibers containing 70.5% of fixed carbon and 69% of nitrobenzene insolubles and having an average fiber diameter of 20 $\mu$ and an average fiber length of 200 $\mu$. The sheets were then carbonized by burning and thereafter heated at 2,000° C. Table 6 shows the results of carbonizing. Table 7 shows the general properties of the porous carbon sheets obtained in consequence of the carbonization. Table 8 shows the mechanical and electrical properties of the sheets.

These results evidently indicate that the bulk density, void ratio, bending strength and specific resistance can be controlled by varying the amount of polyethylene glycol incorporated in the diluting solutions.

Table 5

| | Water | Ethanol | Polyethylene glycol (molecular weight 400) |
|---|---|---|---|
| | wt % | wt % | wt % |
| 1. | 35 | 35 | 30 |
| 2. | 30 | 30 | 40 |
| 3. | 25 | 25 | 50 |
| 4. | 20 | 20 | 60 |

Table 6

| Composition No. of diluting solution | 1 | 2 | 3 | 4 |
|---|---|---|---|---|
| Amount of polyethylene glycol incorporated | 30% | 40% | 50% | 60% |
| Yield of carbonization (%) | 65.8 | 62.0 | 58.8 | 54.7 |
| Coefficient of linear contraction (%) | 18.2 | 20.3 | 22.8 | 25.4 |

Table 7

| Composition No. of diluting solution | 1 | 2 | 3 | 4 |
|---|---|---|---|---|
| Amount of polyethylene glycol incorporated | 30% | 40% | 50% | 60% |
| Thickness, mm | 0.44 | 0.45 | 0.44 | 0.35 |
| Sheet weight, g/m² | 230 | 248 | 254 | 243 |
| Bulk density, g/cm³ | 0.53 | 0.55 | 0.61 | 0.70 |
| Void ratio (%) | 67.5 | 65.8 | 62.3 | 56.4 |

Table 8

| Composition No. of diluting solution | 1 | 2 | 3 | 4 |
|---|---|---|---|---|
| Amount of polyethylene glycol incorporated | 30% | 40% | 50% | 60% |
| Bending strength, kg/mm² | 1.37 | 1.82 | 2.36 | 2.75 |
| Young's modulus kg/mm² | 225 | 360 | 455 | 506 |
| Flexure at break, mm/10 cm | 5.2 | 5.1 | 5.0 | 4.8 |
| Specific resistance × 10⁻²Ωcm | 1.98 | 1.55 | 1.45 | 1.20 |

EXAMPLE 3

By following the procedure of Example 1, sheets were formed by using the oxidized pitch fibers containing 76% fixed carbon and 58% nitrobenzene insolubles and having a common average fiber diameter of 5 $\mu$ and different average fiber lengths of 30 $\mu$, 100 $\mu$ and 1 mm and a diluting solution composed of 30% by weight of water, 30% by weight of methanol and 40% by weight of propylene glycol. The sheets were then carbonized by burning and subjected to a heat treatment at 2,000° C.

Table 9 shows the general properties of the porous carbon sheets obtained.

These results clearly indicate that sheet weight, bulk density, void ratio and void dimensions can be varied in a sheet of uniform thickness by varying the length of starting fibers.

Table 9

| Length of starting fibers | 30 $\mu$ | 100 $\mu$ | 1 mm |
|---|---|---|---|
| Thickness, m/m | 0.46 | 0.44 | 0.45 |
| Sheet weight, g/m² | 315 | 258 | 118 |
| Bulk density, g/cm³ | 0.73 | 0.56 | 0.25 |
| Void ratio, (%) | 53.6 | 63.4 | 80.7 |

Table 9-continued

| Length of starting fibers | 30 μ | 100 μ | 1 mm |
|---|---|---|---|
| *Void dimension, μ | 20 | 30 | 125 |

*The term "void dimension" represents the average value found by measuring void sizes, in the photomicrograph, of a cross-sectional structure and then converting the obtained values by taking into account the degree of magnification.

What is claimed is:

1. A method for the production of porous carbon sheet, comprising:

forming a dispersion of a liquid medium containing at least one wetting agent having at least one hydroxyl group and a boiling point of not less than 150° C and oxidized pitch fibers which contain 45 – 90% by weight nitrobenzene insolubles and 55 – 96% by weight fixed carbon, a diameter in the range of 5 to 100 μ, a length/fiber diameter ratio of not less than 2, and which will not melt and flow through a 1 mm nozzle when placed under a load of 10 kg/cm² at a temperature of 300° C;

subsequently forming the resultant dispersion into the form of a sheet;

heating said sheet thus obtained at a temperature within the range of from 50° to 300° C;

and thereafter, carbonizing said sheet in a nonxidizing atmosphere.

2. The method of claim 1 wherein said liquid medium is a mixture of two or more of said wetting agents compounds.

3. The method of claim 1 wherein the said liquid medium is a solution of at least one of said wetting agents.

4. The method of claim 1 wherein said wetting agent is alkylene glycol, a polyalkylene glycol, glycerine or cyclohexanol.

5. The method of claim 4, wherein said alkylene glycol is ethylene glycol or propylene glycol.

6. The method of claim 4, wherein said polyalkylene glycol is polyethylene glycol or polypropylene glycol.

7. The method of claim 3, wherein the solvent is water or a lower alcohol.

8. The method of claim 1 wherein said dispersion is formed into the shape of a sheet by means of a filter and said sheet is subjected to said heating while supported by said filter.

9. The porous carbon sheet obtained by the method of claim 1 wherein the individual fibers are fused to one another at their points of contact.

* * * * *